United States Patent
Du et al.

(10) Patent No.: US 12,531,431 B2
(45) Date of Patent: Jan. 20, 2026

(54) CHARGING CONTROL METHOD, ELECTRONIC DEVICE AND STORAGE MEDIUM

(71) Applicant: BEIJING XIAOMI MOBILE SOFTWARE CO., LTD., Beijing (CN)

(72) Inventors: Longfei Du, Beijing (CN); Jinhu Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 310 days.

(21) Appl. No.: 17/331,392

(22) Filed: May 26, 2021

(65) Prior Publication Data

US 2022/0060042 A1   Feb. 24, 2022

(30) Foreign Application Priority Data

Aug. 24, 2020   (CN) .......................... 202010857737.0

(51) Int. Cl.
*H02J 7/00*   (2006.01)
(52) U.S. Cl.
CPC .... *H02J 7/007182* (2020.01); *H02J 7/00045* (2020.01); *H02J 7/0048* (2020.01)
(58) Field of Classification Search
CPC ............. H02J 7/007182; H02J 7/00045; H02J 7/70048
USPC ........................................................ 320/162
See application file for complete search history.

(56) References Cited

U.S. PATENT DOCUMENTS

| | | | |
|---|---|---|---|
| 2007/0031725 A1* | 2/2007 | Schulze-Beckinghausen | H01M 10/48 429/65 |
| 2011/0140664 A1* | 6/2011 | Aradachi | H02J 7/0013 320/116 |
| 2016/0380544 A1* | 12/2016 | Zapata | H02M 3/33592 363/21.02 |
| 2017/0279286 A1* | 9/2017 | Zhang | H04B 3/54 |
| 2018/0118049 A1* | 5/2018 | Ko | B60L 58/12 |

(Continued)

FOREIGN PATENT DOCUMENTS

| CN | 106602160 A | 4/2017 |
|---|---|---|
| CN | 107171380 A | 9/2017 |
| CN | 107332316 A | 11/2017 |

OTHER PUBLICATIONS

European Patent Application No. 21176580.5 extended Search and Opinion dated Nov. 29, 2021, 6 pages.
(Continued)

*Primary Examiner* — Drew A Dunn
*Assistant Examiner* — Pamela J Jeppson
(74) *Attorney, Agent, or Firm* — Cozen O'Connor

(57) ABSTRACT

A charging control method, and an electronic device and/or a storage medium implementing the charging control method, includes: determining a current state parameter of a battery, wherein the battery is charged with a first charging parameter corresponding to a first charging stage defined in a staged charging strategy; determining an expected state parameter of the battery after continuing to be charged for a preset time period based on the current state parameter and the first charging parameter; and charging the battery with a second charging parameter corresponding to a second charging stage defined in the staged charging strategy, when the expected state parameter matches the second charging stage.

18 Claims, 3 Drawing Sheets

(56) References Cited

U.S. PATENT DOCUMENTS

| | | | |
|---|---|---|---|
| 2019/0081501 A1* | 3/2019 | Sun | B60L 58/13 |
| 2019/0291600 A1* | 9/2019 | Takemoto | B60L 53/62 |
| 2020/0209315 A1 | 7/2020 | Ahn | |

OTHER PUBLICATIONS

Chinese Patent Application No. 202010857737.0, Office Action dated Feb. 8, 2024, 6 pages.
Chinese Patent Application No. 202010857737.0, English translation of Office Action dated Feb. 8, 2024, 8 pages.
Chinese Patent Application No. 202010857737.0, Office Action dated Dec. 25, 2024, with English translation, 11 pages.

* cited by examiner

CHARGING CONTROL METHOD, ELECTRONIC DEVICE AND STORAGE MEDIUM

CROSS REFERENCE TO RELATED APPLICATION

This application is based on and claims priority to Chinese patent application No. 202010857737.0 filed on Aug. 24, 2020, the content of which is incorporated herein by reference in its entirety.

TECHNICAL FIELD

The present disclosure relates to a technical field of battery charging, and in particular to, a charging control method, an electronic device and a storage medium.

BACKGROUND

A staged charging strategy is adopted to charge a battery, to increase a charging rate and to reduce a charging duration. The staged charging refers to a method of dividing a charging process of the battery into a plurality of charging stages. In each stage, the battery is charged with a different current correspondingly. When a charging voltage of the battery reaches a charging cut-off voltage corresponding to the current stage, the charging stage is switched to the next charging stage.

SUMMARY

The present disclosure provides a charging control method, an electronic device and a storage medium.

In detail, the present disclosure is implemented through the following technical solutions.

In a first aspect, embodiments of the disclosure provide a charging control method. The method includes: determining a current state parameter of a battery, in which the battery is charged with a first charging parameter corresponding to a first charging stage defined in a staged charging strategy; determining an expected state parameter of the battery after continuing to be charged for a preset time period based on the current state parameter and the first charging parameter; and charging the battery with a second charging parameter corresponding to a second charging stage defined in the staged charging strategy, when the expected state parameter matches the second charging stage.

In a second aspect, an electronic device is provided. The electronic device includes: a processor and a memory for storing executable instructions by the processor. When the instructions are executed by the processor, a charging control method is implemented and the processor is configured to: determine a current state parameter of a battery, in which the battery is charged with a first charging parameter corresponding to a first charging stage defined in a staged charging strategy; determine an expected state parameter of the battery after continuing to be charged for a preset time period based on the current state parameter and the first charging parameter; and charge the battery with a second charging parameter corresponding to a second charging stage defined in the staged charging strategy, when the expected state parameter matches the second charging stage In a third aspect, embodiments of the present disclosure provide a computer-readable storage medium having a computer program stored thereon, when the program is executed by a processor, a charging control method is implemented and the method includes: determining a current state parameter of a battery, in which the battery is charged with a first charging parameter corresponding to a first charging stage defined in a staged charging strategy; determining an expected state parameter of the battery after continuing to be charged for a preset time period based on the current state parameter and the first charging parameter; and charging the battery with a second charging parameter corresponding to a second charging stage defined in the staged charging strategy, when the expected state parameter matches the second charging stage.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Figure 1:
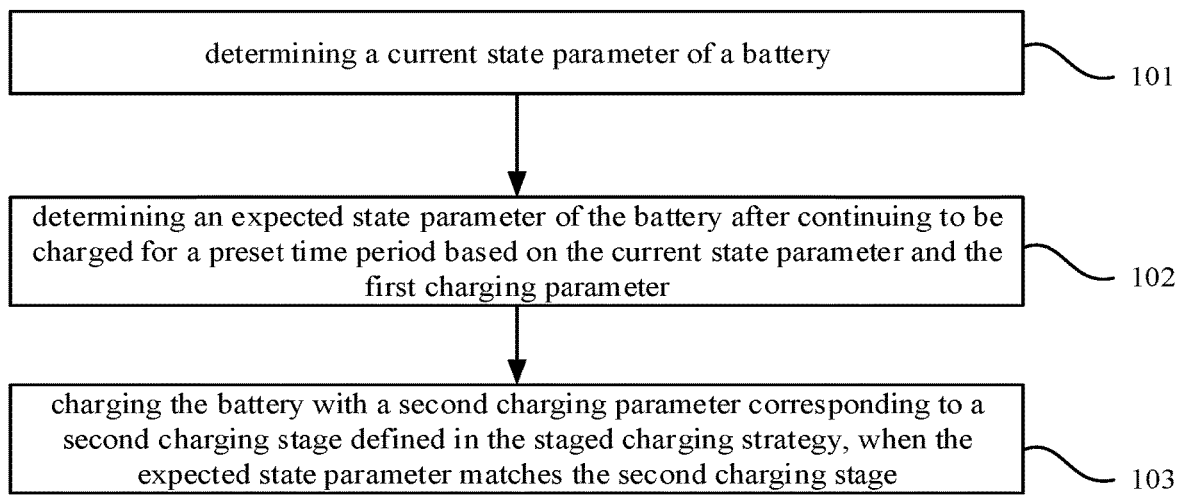
FIG. 1 is a flowchart of a charging control method according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms in the present disclosure are only for the purpose of describing specific embodiments, and are not intended to limit the present disclosure. The singular forms of "a", "said" and "the" in the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second and third may be used in this disclosure to describe various information, the information should not be limited to these terms. These terms are only used to distinguish the same type of information from each other. For example, without departing from the scope of the present disclosure, the first information may also be referred to as the second information, and similarly, the second information may also be referred to as the first information. In different contexts, the term "if" used herein is interpreted as "when" or "while" or "in response to determining".

A staged charging strategy is adopted to charge a battery, to increase a charging rate and to reduce a charging duration. The staged charging refers to dividing a battery charging process into a plurality of charging stages, and at each stage, the battery is charged with a different current or voltage.

The following shows charging parameters of a staged charging strategy. The staged charging strategy divides the battery charging process into five stages.

At charging stage a, a charging current is 1.67 A, and a charging cut-off voltage is 3.48±0.02V.

At charging stage b, a charging current is 8 A, and a charging cut-off voltage is 3.76±0.02V.

At charging stage c, a charging current is 7 A, and a charging cut-off voltage is 3.86±0.02V.

At charging stage d, a charging current is 6 A, and a charging cut-off voltage is 4.11±0.02V.

At charging stage e, a charging current is 1.67 A, and a charging cut-off voltage is 4.30±0.02V.

The battery is charged with the charging parameter (the charging current of 1.67 A) of the charging stage a, when the voltage of the battery reaches 3.48±0.02 v, the charging stage is switched to the charging stage b. Charging of the battery continues with the charging parameter (the charging current of 8 A) of the charging stage b until the voltage of the battery reaches 3.76±0.02 v, and then the charging stage is switched to the charging stage c. Charging of the battery continues with the charging parameter (the charging current of 7 A) of the charging stage c, and so on.

In the entire charging process, the battery requires to communicate with a charger to adjust voltage and current values of the charger to achieve switching between the charging stages. Due to hardware and charging protocols, there is a certain delay in the switching between the charging stages. During the delay period, the charger will not stop charging the battery, that is, the charger still charges the battery, and the charging voltage of the battery is greater than the charging cut-off voltage corresponding to the current stage where the battery is at, that is, the above charging method has an overvoltage problem, which damages the battery and causes the battery to be abnormal.

Based on the above situation, the embodiments of the present disclosure provide a charging control method. In the process of charging the battery with the staged charging strategy, it is determined whether the battery has an overvoltage risk in real time. When the determination result is that there may be the overvoltage risk, the charging stage of the battery is switched in time, and different charging parameters are adopted to charge the battery to avoid damage to the battery due to overvoltage charging.

Next, the embodiments of the present disclosure are described in detail.

FIG. 1 is a flowchart of a charging control method according to an exemplary embodiment of the present disclosure. The method is applicable for charging a battery of a terminal device such as a mobile phones and a tablet computer, and is also applicable for charging a power battery of a new energy vehicle. As illustrated in FIG. 1, the method may include the following.

At block 101, a current state parameter of a battery is determined.

At block 101, the battery is charged with the staged charging strategy. In the staged charging strategy, multiple charging stages are defined according to actual requirements, and each charging stage has a corresponding set of charging parameters. The charging parameters include, but are not limited to, a charging current and a charging cut-off voltage.

For distinguishing the stages, the current charging stage of the battery is referred to as a first charging stage, and the next charging stage of the battery is referred to as a second charging stage hereinafter.

The current state parameter of the battery is the state parameter of the battery obtained during a process of charging the battery with the charging parameters corresponding to the first charging stage. The current state parameter is recorded and detected by a battery management chip of the battery, which include but not be limited to a current charging voltage of the battery, a currently remaining capacity of the battery, the number of cycles of charging related to an aging of the battery, a battery temperature and other parameters.

At block 102, an expected state parameter of the battery after continuing to be charged for a preset time period is determined based on the current state parameter and the first charging parameter.

The preset time period may be a response time period of switching from the first charging stage to the second charging stage.

In an embodiment, when the charging currents corresponding to respective charging stages defined in the staged charging strategy decreases (or increases) by degrees sequentially. The charging stage of the battery is matched according to the expected state parameter, such as an expected charging voltage of the battery after continuing to be charged for the preset time period. At block 102, it is required to determine the expected charging voltage of the battery.

Figure 2:
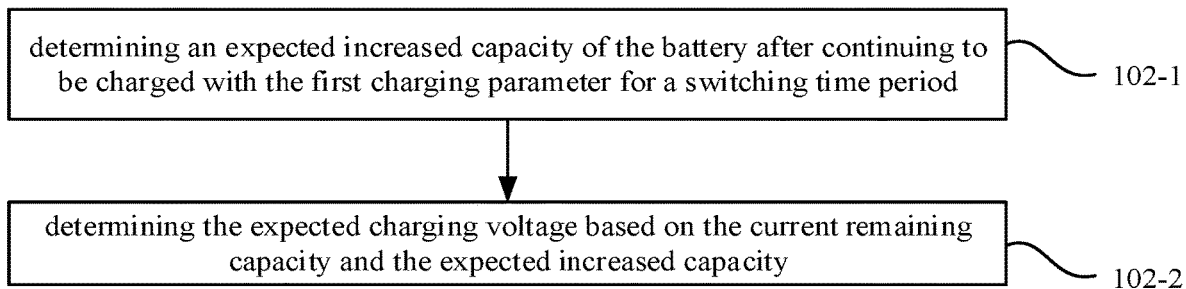
FIG. 2 is a flowchart of determining an expected charging voltage according to an exemplary embodiment of the present disclosure.

As illustrated in FIG. 2, the following describes the process of determining the expected charging voltage.

At block 102-1, an expected increasing capacity of the battery after the battery continuing to be charged with the first charging parameter for a preset time period is determined.

Assuming that the charging current corresponding to the first charging parameter is $I_1$, the expected capacity increase is determined according to $I_1 \times \Delta t$, $\Delta t$ represents the preset time period.

When the battery management chip may record the charging stage of the battery, the charging current $I_1$ may be determined according to the current charging stage of the battery recorded by the battery management chip, that is, the charging current corresponding to the charging stage defined in the staged charging strategy is taken as the current charging current of the battery. Taking the above staged charging strategy that defines five charging stages as an example, when the battery management chip records that the battery is currently at the charging stage c, and the charging current corresponding to the charging stage c defined in the staged charging strategy is 7 A, it is determined that $I_1=7$ A.

When the battery management chip does not record the charging stage of the battery, the charging current $I_1$ may be determined according to the current charging voltage of the battery. In detail, the battery management chip may detect the current charging voltage of the battery, and determine a stage corresponding to the charging cut-off voltage matching the charging voltage defined in the staged charging strategy as the current stage of the battery, and a charging current corresponding to the current stage is determined as the current charging current of the battery. Taking the above staged charging strategy with five charging stages as an example, when the battery management chip detects that the current charging voltage of the battery is 3.8V, within a range of the charging cut-off voltage of 3.76±0.02V, it is determined that the current charging stage of the battery is the charging stage b, and the charging current corresponding to the charging stage b defined in the staged charging strategy is determined as the current charging current of the battery, namely, $I_1$=8 A.

At block 102-2, the expected charging voltage is determined based on the currently remaining capacity and the expected increasing capacity.

A calculation method to determine the expected charging voltage is given below:

$$E_1 = V_{ocv1} + I_1 * R_1$$

$E_1$ represents the expected charging voltage, $V_{ocv1}$ represents an expected open circuit voltage of the battery when continuing to be charged for the preset time period. The expected open circuit voltage is related to the currently remaining capacity and the expected increasing capacity. $I_1 * R_1$ represents a polarization voltage of the battery, $I_1$ represents the current charging current of the battery. $R_1$ represents the current internal resistance of the battery.

In an embodiment, $V_{ocv1}$ is determined based on the currently remaining capacity, the expected increasing capacity, and the open circuit voltage model of the battery. In detail, a sum of the currently remaining capacity $C_1$ of the battery and the expected increasing capacity $I_1 \times \Delta t$ is input into the open circuit voltage model of the battery, The expected open circuit voltage $V_{ocv1}$ of the battery is output from the open circuit voltage model.

During determining the open circuit voltage model, the battery may be charged from 0% to 100% and then discharges to 0% by adopting ultra-low current. In this process, data of State of Charge (SOC) of the battery and an Open Circuit Voltage (OCV) are measured, the data of the SOC and the OCV are fitted, and a fitting result is the open circuit voltage model. The SOC of the battery reflects a remaining power of the battery, namely SOC=remaining capacity/ maximum available capacity, and a factory capacity of the battery is generally regarded as the maximum available capacity. In the process of fitting the model, the fitting result is corrected based on changes of State of Health (SOH) and temperature of the battery. The open circuit voltage model uses the data of the SOC and the OCV as training samples, which are constructed through machine learning.

In an embodiment, the current internal resistance $R_1$ of the battery may be determined by some aging parameters related to the aging of the battery and an aging model of the battery. In detail, the aging parameters are input to the aging model, and the aging model outputs the current internal resistance $R_1$ of the battery.

During determining the aging model, internal resistances of the battery under different aging parameters are obtained, the aging parameters and the internal resistances are fitted to obtain the fitting result as the aging model. The aging parameters may include, but are not limited to, the number of the cycles of charging, the battery temperature, the remaining battery capacity and a usage scenario. The aging model uses data of the aging parameters and the internal resistances as training samples, which are constructed through machine learning.

In another embodiment, when charging currents corresponding to respective charging stages defined in the staged charging strategy do not decrease (or increase) by degrees sequentially, reference to the above staged charging strategy that defines five charging stages, the defined charging currents are first increasing and then decreasing. At this time, stage matching cannot be performed only based on the expected state parameter of the expected charging voltage, therefore another expected state parameter, i.e., the current charging voltage of the battery, is required for performing the stage matching.

In an embodiment, the current charging voltage of the battery may be detected by the battery management chip.

In another embodiment, the current charging voltage of the battery may be obtained by calculation. For example, a way to determine the current charging voltage is described below:

$$E_2 = V_{ocv2} + I_1 * R_1$$

$E_2$ represents the current charging voltage, and $V_{ocv2}$ represents the current open circuit voltage of the battery.

In an embodiment, $V_{ocv2}$ is determined based on the currently remaining capacity $C_1$ and the open circuit voltage model of the battery. In detail, the currently remaining capacity $C_1$ is input into the open circuit voltage model of the battery, and the open circuit voltage model outputs the current open circuit voltage $V_{ocv2}$ of the battery.

The specific implementation processes for determining the current charging current $I_1$ and the current internal resistance $R_1$ of the battery is similar to the description of block 102-2, which is not repeated here.

At block 103, the battery is charged with a second charging parameter corresponding to a second charging stage defined in the staged charging strategy, when the expected state parameter matches the second charging stage.

When the expected state parameter is the expected charging voltage, at block 103, it is determined whether the expected charging voltage falls within a range of the charging cut-off voltage corresponding to the second charging stage. When the expected charging voltage falls within the range, it means that the battery is currently charged with the charging current $I_1$. After the battery continues to be charged with the charging current $I_1$ for $\Delta t$, the charging voltage of the battery will exceed the range of the charging cut-off voltage corresponding to the current charging stage of the battery, and the battery is at risk of overvoltage. Therefore, the battery cannot continue to be charges with the charging current $I_1$, and it is required to switch the charging stage of the battery in time, that is, switch to charging the battery with the second charging parameter corresponding to the second charging stage. When the expected charging voltage does not fall within the range, it means that even after the battery continues to be charged with the charging current $I_1$ for $\Delta t$, the charging voltage of the battery does not exceed the range of the charging cut-off voltage corresponding to the current charging stage of the battery, and there is no risk of overvoltage, the battery continues to be charged with the charging current $I_1$.

When the expected state parameters include the current charging voltage and the expected charging voltage, at block 103, the charging stage is matched based on the expected charging voltage and the current charging voltage, that is, it is determined that the expected charging voltage and the current charging voltage respectively fall into which range of the charging cutoff voltage corresponds to which charging stage, and then whether stage switching is required and switching to which stage is determine. For example, when the battery is currently charged with the charging parameters corresponding to the first charging stage, and the expected charging voltage and the current charging voltage both fall within the range of the charging cut-off voltage corresponding to the first charging stage, the battery continues to be charged with the charging parameters corresponding to the first charging stage. When the current charging voltage falls within a range of the charging cut-off voltage corresponding to the first charging stage, and the expected charging voltage falls within a range of the charging cut-off voltage corresponding to the second charging stage, then the charging stage of the battery is switched to the second charging stage from the first charging stage, and the battery is charged with the charging parameters corresponding to the second charging stage.

With the charging control method of the embodiments of the present disclosure, the current state parameter of the battery is detected in real time during the charging process, and whether the battery has the overvoltage risk is analyzed according to the current state parameter and the charging parameters of the battery. When the overvoltage risk exists, the charging stage of the battery is switched in time. Compared to switching the charging stage only when the charging voltage of the battery reaches the charging cut-off voltage corresponding to the current charging stage, the charging overvoltage problem caused by switching delay is effectively improved and damage to the battery is prevented.

Figure 3:
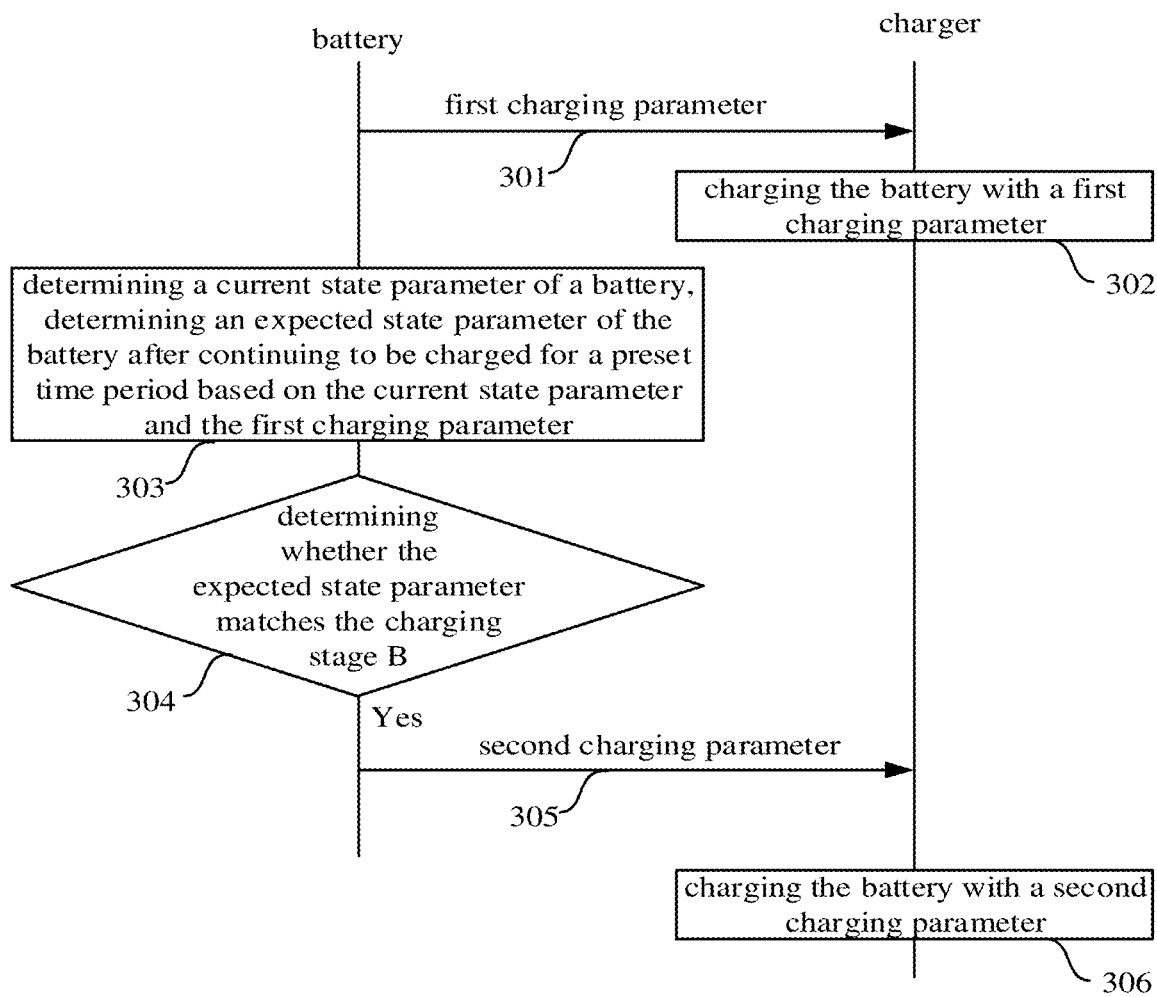
FIG. 3 is a flowchart of another charging control method according to an exemplary embodiment of the present disclosure.

FIG. 3 is a flowchart of a charging control method according to another exemplary embodiment of the present disclosure. In this embodiment, through interaction between the battery and the charger, the process of charging the battery with the staged charging strategy is illustrated. Taking the staged charging strategy defines two charging stages (the charging stage A and the charging stage B) as an example in the figures, as illustrated in FIG. 3, the method may include the following blocks.

At block 301, the battery sends the first charging parameter of the charging stage A to the charger.

For example, the battery may include the battery management chip and a cell. The battery may send the first charging parameter to the charger through the battery management chip, or the battery may send the first charging parameter to the charger by a terminal device or a new energy vehicle that uses the battery.

At block 302, the charger charges the battery with the first charging parameter.

Assuming the first charging parameters of the charging stage A includes the charging current of 8 A, and the charging cut-off voltage of 4.25V±0.1V, and the second charging parameters of the charging stage B includes the charging current of 6 A, and the charging cut-off voltage of 4.35V±0.1V.

At block 302, the charger charges the cell with the charging current of 8 A.

At block 303, the battery determines the current state parameter of the battery during the charging process, and analyzes the expected state parameter of the battery after continuing to be charged for the preset time period according to the current state parameter and the first charging parameter.

The implementation process of block 303 is similar to block 101 and block 102, which is not repeated here.

At block 304, the battery determines whether the expected state parameter matches the charging stage B.

In the following, the matching process is described by taking stage matching according to the two expected state parameters of the expected charging voltage and the current charging voltage of the battery as an example.

When it is determined that the expected charging voltage $E_1$ and the current charging voltage $E_2$ of the battery both do not exceed the range of the charging cut-off voltage corresponding to the charging stage A, according to the current state parameters of the battery, the first charging parameter and the formulas $E_1=V_{ocv1}+I_1*R_1$ and $E_2=V_{ocv2}+I_1*R_1$, no action will be performed, and the charger continues to charge the battery with the charging current of 8 A.

When it is determined that the expected charging voltage $E_1$ exceeds the range of the charging cut-off voltage corresponding to the charging stage A and falls into the range of the charging cut-off voltage corresponding to the charging stage B, according to the current state parameters of the battery, the first charging parameter and the formulas $E_1=V_{ocv1}+I_1*R_1$ and $E_2=V_{ocv2}I_1*R_1$, the battery performs block 305 to send the second charging parameter to the charger, to trigger the charger to charge the battery with the second charging parameter.

At block 305, the battery sends the second charging parameter to the charger.

At block 306, the charger charges the battery with the second charging parameter.

Taking the charging parameters of the charging stage defined at block 302 as an example, at block 305, when the charger receives the second charging parameter, the battery is charged with the charging current of 6 A.

In an embodiment, before block 301, the battery may first determine a type of the charger and determine whether the charger supports a private protocol, that is, whether the battery supports switching the charging stage according to the current state parameter and the charging parameter of the battery.

In detail, the battery sends a handshake request to the charger. When the battery does not receive handshake information returned by the charger in response to the handshake request within another preset time period, it means that the charger does not support the private protocol, and the battery is charged in a traditional way. When the battery receives the handshake information returned by the charger in response to the handshake request within the preset time period, it means that the charger supports the private protocol, the battery is charged based on the charging control method of the embodiments of the present disclosure.

With the charging control method of the embodiments of the present disclosure, in the process of charging the battery, the expected charging voltage of the battery after continuing to be charged for a response time period (that is the preset time period) is analyzed in advance, and whether an overvoltage risk exists is further determined. Thus, following a principle of first calculation, judgment, and then action, it is ensured that the response time of the switching between the charging stages will not result in the voltage excessing the preset charging cut-off voltage during the charging process, and will not cause safety problems such as battery overvoltage.

Corresponding to the above embodiments of the charging control method, the present disclosure also provides an embodiment of the charging control apparatus.

Figure 4:
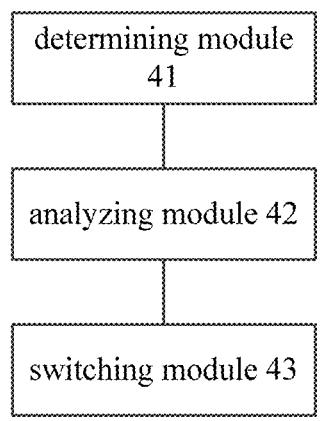
FIG. 4 is a schematic diagram of modules of a charging control apparatus according to an exemplary embodiment of the present disclosure.

FIG. 4 is a schematic diagram of modules of a charging control apparatus according to an exemplary embodiment of the present disclosure. The apparatus further includes: a determining module 41, an analyzing module 42 and a switching module 43.

The determining module 41 is configured to determine a current state parameter of a battery, in which the battery is charged with a first charging parameter corresponding to a first charging stage defined in a staged charging strategy.

The analyzing module 42 is configured to determine an expected state parameter of the battery after continuing to be charged for a preset time period based on the current state parameter and the first charging parameter.

The switching module 43 is configured to charge the battery with a second charging parameter corresponding to a second charging stage defined in the staged charging strategy, when the expected state parameter matches the second charging stage.

Optionally, the current state parameter includes a currently remaining capacity, and the expected state parameter includes an expected charging voltage, and the analyzing module is configured to: determine an expected increasing capacity of the battery after continuing to be charged with the first charging parameter for the preset time period; and determine the expected charging voltage based on the currently remaining capacity and the expected increasing capacity, and determine whether the expected charging voltage matches the second charging stage.

Optionally, when determining the expected charging voltage, the analyzing module is configured to: determine an expected open circuit voltage of the battery after continuing to be charged for the preset time period based on the currently remaining capacity, the expected increasing capacity, and an open circuit voltage model of the battery; determine a polarization voltage of the battery; and determine a sum of the polarization voltage and the expected open circuit voltage as the expected charging voltage.

Optionally, the analyzing module is configured to determine a current charging voltage of the battery based on the currently remaining capacity, to match a charging stage based on the expected charging voltage and the current charging voltage.

Optionally, when determining the current charging voltage of the battery based on the currently remaining capacity, the analyzing module is configured to: determine a current open circuit voltage of the battery based on the currently remaining capacity and the open circuit voltage model of the battery; determine the polarization voltage of the battery; and determine the sum of the polarization voltage and the current open circuit voltage as the current charging voltage.

Optionally, the first charging parameter includes a charging current, and the current state parameter includes an aging parameter of the battery, and when determining the polarization voltage of the battery, the analyzing module is configured to: determine a current internal resistance of the battery based on the aging parameter and an aging model of the battery; and determine the polarization voltage based on the charging current and the current internal resistance.

Optionally, the switching module is configured to: send the second charging parameter to a charger configured to charge the battery to enable the charger to charge the battery according to the second charging parameter.

Optionally, the apparatus further includes: a sending module and a receiving module. The sending module is configured to send a handshake request to the charger. The receiving module is configured to send the second charging parameter to the charger when receiving handshake information returned by the charger in response to the handshake request.

Optionally, the preset time period is a response time period for switching to the second charging stage from the first charging stage.

The device embodiments generally correspond to the method embodiments, and relevant part could be referred to the part of the description of the method embodiments. The device embodiments described above are merely illustrative, where the units described as separate components may or may not be physically separated, and the components displayed as units may or may not be physical units, that is, the units may be located in one place, or distributed to a plurality of network units. Some or all of the modules are selected according to actual needs to achieve the objectives of the solution of the present disclosure. Those of ordinary skill in the art can understand and implement the technical solution without inventive works.

Figure 5:
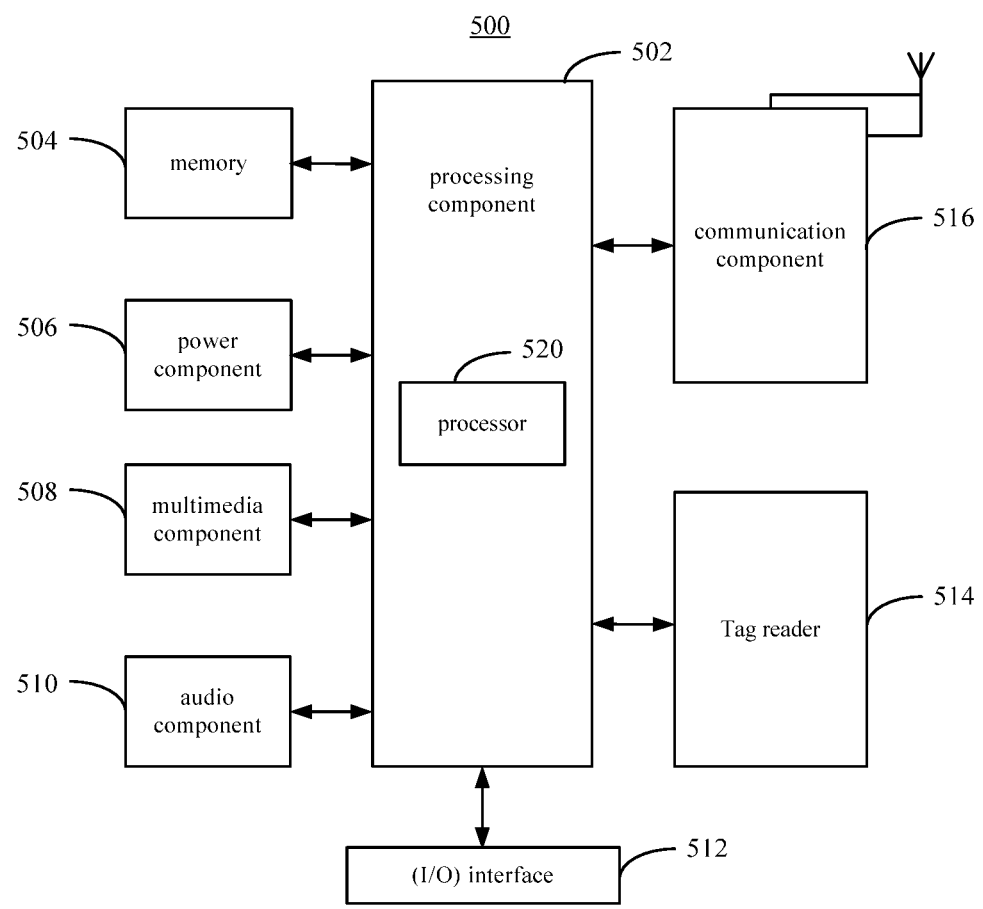
FIG. 5 is a block diagram of an electronic device for charging control according to an exemplary embodiment of the present disclosure.

FIG. 5 is a block diagram of an electronic device for charging control according to an exemplary embodiment of the present disclosure. For example, the device may be a mobile phone, a computer, a digital broadcasting terminal, a message transceiver device, a game console, a tablet device, a medical device, a fitness device and a personal digital assistant.

Referring to FIG. 5, a device 500 may include one or more of the following components: a processing component 502, a memory 504, a power component 506, a multimedia component 508, an audio component 510, an input/output (I/O) interface 512, a sensor component 514, and a communication component 516. The device also includes an antenna module (may be connected to the communication component 516), and the antenna module includes: a radiator, a ground point, a feeding terminal, and a resonance circuit. The radiator includes an open end, and the grounding point is fixed on the radiator. The feeding terminal is electrically connected to a first connection point on the radiator. A first end of the resonant circuit is electrically connected to the first connection point, a second end of the resonant circuit is grounded, and the resonant circuit includes an adjustable unit. A distance from the first connection point to the open end is less than a distance from the first connection point to the ground point.

The processing component 502 typically controls overall operations of the device 500, such as the operations associated with the current state parameter of the battery, parameter calculation and data communication. The processing component 502 may include one or more processors 520 to execute instructions to perform all or part of the steps in the above described methods. Moreover, the processing component 502 may include one or more modules which facilitate the interaction between the processing component 502 and other components.

The memory 504 is configured to store various types of data to support the operation of the device 500. Examples of such data include instructions for any applications or methods operated on the device 500, and state parameters of the device. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A charging control method, comprising:
   determining a current state parameter of a battery, wherein the battery is charged with a first charging parameter corresponding to a first charging stage defined in a staged charging strategy;
   determining an estimated expected state parameter of the battery after continuing to be charged for a preset time period based on the current state parameter and the first charging parameter, wherein the preset time period is a transition period between the first charging stage and the second charging stage; and
   charging the battery with a second charging parameter corresponding to a second charging stage defined in the staged charging strategy, when the estimated expected state parameter matches the second charging stage;
   wherein the estimated expected state parameter comprises an estimated expected charging voltage, the method comprises, when the estimated expected charging voltage falls within a range of a charging cut-off voltage corresponding to the second charging stage, charging the battery with the second charging parameter corresponding to the second charging stage defined in the staged charging strategy, such that switching to charging the battery with the second charging parameter corresponding to the second charging stage is performed before a charging voltage of the battery reaches the charging cut-off voltage corresponding to the second charging stage.

2. The method according to claim 1, wherein the current state parameter comprises a currently remaining capacity, and the estimated expected state parameter comprises an estimated expected charging voltage; and
   wherein determining the estimated expected state parameter comprises:
   determining an estimated expected increasing capacity of the battery after continuing to be charged with the first charging parameter for the preset time period; and
   determining the estimated expected charging voltage based on the currently remaining capacity and the estimated expected increasing capacity, and determining whether the estimated expected charging voltage matches the second charging stage.

3. The method according to claim 2, wherein determining the estimated expected charging voltage comprises:
   determining an estimated expected open circuit voltage of the battery after continuing to be charged for the preset time period based on the currently remaining capacity, the estimated expected increasing capacity, and an open circuit voltage model of the battery;
   determining a polarization voltage of the battery; and
   determining a sum of the polarization voltage and the estimated expected open circuit voltage as the estimated expected charging voltage.

4. The method according to claim 3, wherein the first charging parameter comprises a charging current, and the current state parameter comprises an aging parameter of the battery; and
   wherein determining the polarization voltage of the battery comprises:

determining a current internal resistance of the battery based on the aging parameter and an aging model of the battery; and determining the polarization voltage based on the charging current and the current internal resistance.

5. The method according to claim 2, comprising:
determining a current charging voltage of the battery based on the currently remaining capacity, to match a charging phase based on the estimated expected charging voltage and the current charging voltage.

6. The method according to claim 5, wherein determining the current charging voltage of the battery based on the currently remaining capacity comprises:
determining a current open circuit voltage of the battery based on the currently remaining capacity and the open circuit voltage model of the battery;
determining the polarization voltage of the battery; and
determining the sum of the polarization voltage and the current open circuit voltage as the current charging voltage.

7. The method according to claim 1, wherein charging the battery with the second charging parameter corresponding to the second charging stage comprises:
sending the second charging parameter to a charger configured to charge the battery to enable the charger to charge the battery according to the second charging parameter.

8. The method according to claim 7, further comprising before sending the second charging parameter to the charger:
sending a handshake request to the charger; and
sending the second charging parameter to the charger when receiving handshake information returned by the charger in response to the handshake request.

9. An electronic device, comprising:
a processor;
a memory for storing executable instructions by the processor; wherein,
when the instructions are executed by the processor, a charging control method is implemented and the processor is configured to:
determine a current state parameter of a battery, wherein the battery is charged with a first charging parameter corresponding to a first charging stage defined in a staged charging strategy;
determine an estimated expected state parameter of the battery after continuing to be charged for a preset time period based on the current state parameter and the first charging parameter, wherein the preset time period is a transition period between the first charging stage and the second charging stage; and
charge the battery with a second charging parameter corresponding to a second charging stage defined in the staged charging strategy, when the estimated expected state parameter matches the second charging stage;
wherein the estimated expected state parameter comprises an estimated expected charging voltage, the processor is configured to, when the estimated expected charging voltage falls within a range of a charging cut-off voltage corresponding to the second charging stage, charge the battery with the second charging parameter corresponding to the second charging stage defined in the staged charging strategy, such that switching to charging the battery with the second charging parameter corresponding to the second charging stage is performed before a charging voltage of the battery reaches the charging cut-off voltage corresponding to the second charging stage.

10. The electronic device according to claim 9, wherein the current state parameter comprises a currently remaining capacity, and the estimated expected state parameter comprises an estimated expected charging voltage; and
wherein the processor is configured to:
determine an estimated expected increasing capacity of the battery after continuing to be charged with the first charging parameter for the preset time period; and
determine the estimated expected charging voltage based on the currently remaining capacity and the estimated expected increasing capacity, and determining whether the estimated expected charging voltage matches the second charging stage.

11. The electronic device according to claim 10, wherein the processor is configured to:
determine an estimated expected open circuit voltage of the battery after continuing to be charged for the preset time period based on the currently remaining capacity, the estimated expected increasing capacity, and an open circuit voltage model of the battery;
determine a polarization voltage of the battery; and
determine a sum of the polarization voltage and the estimated expected open circuit voltage as the estimated expected charging voltage.

12. The electronic device according to claim 11, wherein the processor is configured to:
determine a current open circuit voltage of the battery based on the currently remaining capacity and the open circuit voltage model of the battery;
determine the polarization voltage of the battery; and
determine the sum of the polarization voltage and the current open circuit voltage as the current charging voltage.

13. The electronic device according to claim 11, wherein the first charging parameter comprises a charging current, and the current state parameter comprises an aging parameter of the battery; and
wherein the processor is configured to:
determine a current internal resistance of the battery based on the aging parameter and an aging model of the battery; and
determine the polarization voltage based on the charging current and the current internal resistance.

14. The electronic device according to claim 10, wherein the processor is configured to:
determine a current charging voltage of the battery based on the currently remaining capacity, to match a charging phase based on the estimated expected charging voltage and the current charging voltage.

15. The electronic device according to claim 9, wherein the processor is configured to:
send the second charging parameter to a charger configured to charge the battery to enable the charger to charge the battery according to the second charging parameter.

16. The electronic device according to claim 15, wherein the processor is configured to:
before sending the second charging parameter to the charger, send a handshake request to the charger; and
send the second charging parameter to the charger when receiving handshake information returned by the charger in response to the handshake request.

17. A computer-readable storage medium having a computer program stored thereon, wherein when the program is executed by a processor, a charging control method is implemented and the method comprises:

determining a current state parameter of a battery, wherein the battery is charged with a first charging parameter corresponding to a first charging stage defined in a staged charging strategy;

determining an estimated expected state parameter of the battery after continuing to be charged for a preset time period based on the current state parameter and the first charging parameter, wherein the preset time period is a transition period between the first charging stage and the second charging stage; and charging the battery with a second charging parameter corresponding to a second charging stage defined in the staged charging strategy, when the estimated expected state parameter matches the second charging stage;

wherein the estimated expected state parameter comprises an estimated expected charging voltage, the method comprises, when the estimated expected charging voltage falls within a range of a charging cut-off voltage corresponding to the second charging stage, charging the battery with the second charging parameter corresponding to the second charging stage defined in the staged charging strategy, such that switching to charging the battery with the second charging parameter corresponding to the second charging stage is performed before a charging voltage of the battery reaches the charging cut-off voltage corresponding to the second charging stage.

18. The storage medium according to claim 17, wherein the current state parameter comprises a currently remaining capacity, and the estimated expected state parameter comprises an estimated expected charging voltage; and wherein determining the estimated expected state parameter comprises:

determining an estimated expected increasing capacity of the battery after continuing to be charged with the first charging parameter for the preset time period; and determining the estimated expected charging voltage based on the currently remaining capacity and the estimated expected increasing capacity, and determining whether the estimated expected charging voltage matches the second charging stage.

* * * * *